US009650531B2

(12) United States Patent
Kiyomoto et al.

(10) Patent No.: US 9,650,531 B2
(45) Date of Patent: May 16, 2017

(54) INK COMPOSITION FOR INKJET RECORDING

(71) Applicant: TOSHIBA TEC KABUSHIKI KAISHA, Tokyo (JP)

(72) Inventors: Hiroshi Kiyomoto, Hiratsuka Kanagawa (JP); Takaya Kitawaki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 14/551,579

(22) Filed: Nov. 24, 2014

(65) Prior Publication Data

US 2015/0148469 A1 May 28, 2015

(30) Foreign Application Priority Data

Nov. 25, 2013 (JP) ................................ 2013-242825

(51) Int. Cl.

*C09D 11/107* (2014.01)
*C09D 11/322* (2014.01)
*C09D 11/38* (2014.01)
*B41J 2/01* (2006.01)
*B41M 7/00* (2006.01)

(52) U.S. Cl.

CPC ................. *C09D 11/38* (2013.01); *B41J 2/01* (2013.01); *B41M 7/00* (2013.01); *C09D 11/107* (2013.01); *C09D 11/322* (2013.01)

(58) Field of Classification Search

CPC ..... C09D 11/38; C09D 11/107; C09D 11/322; B41J 2/01; B41M 7/00

See application file for complete search history.

(56) References Cited

U.S. PATENT DOCUMENTS 7,638,561 B2 12/2009 Fu et al.
7,696,262 B2 4/2010 Cagle et al.
7,906,453 B2 * 3/2011 Ezenyilimba ............ B01J 21/18 502/182
8,361,214 B2 1/2013 Kiyomoto et al.
2006/0262174 A1 * 11/2006 Aoai ..................... B41C 1/1066 347/100
2010/0086692 A1 * 4/2010 Ohta ...................... C09D 11/40 427/256
2011/0048278 A1 * 3/2011 Kiyomoto ............ C09D 11/322 106/31.86

FOREIGN PATENT DOCUMENTS

WO WO 99/23182 * 5/1999

* cited by examiner

*Primary Examiner* — Patrick Niland

(74) *Attorney, Agent, or Firm* — Patterson & Sheridan LLP

(57) ABSTRACT

In accordance with one embodiment, an ink composition for inkjet recording comprises a pigment, a pigment dispersant, water, a water-soluble solvent, a wettability enhancer including 2,5,8,11-tetramethyl-6-dodecyne-5,8-diol, and an aqueous resin emulsion.

17 Claims, 1 Drawing Sheet

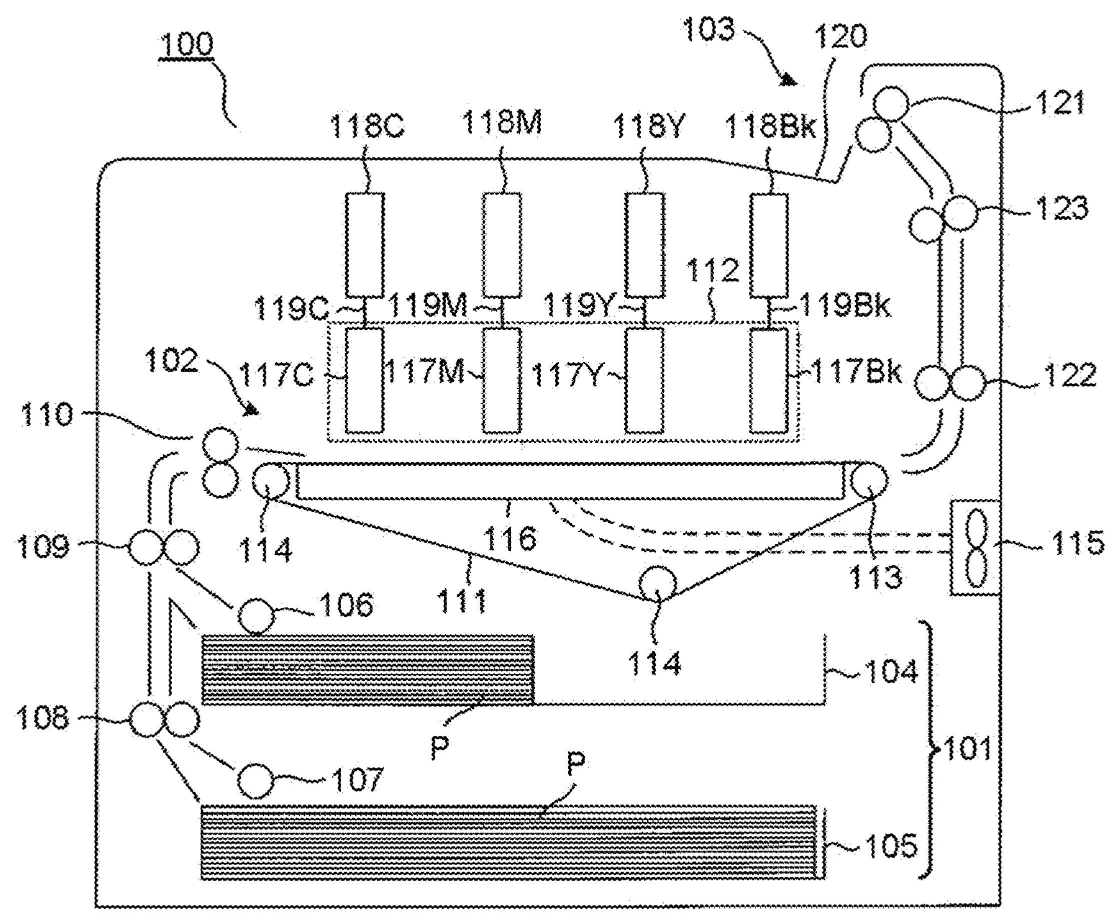
100
103
120
121
118C
118M
118Y
118Bk
123
112
119C
119M
119Y
119Bk
102
117C
117M
117Y
117Bk
122
110
114
116
113
115
109
111
106
114
104
108
P
101
107
P
105

INK COMPOSITION FOR INKJET RECORDING

CROSS-REFERENCE TO RELATED APPLICATION

This application is based upon and claims the benefit of priority from Japanese Patent Application No. 2013-242825, filed Nov. 25, 2013, the entire contents of which are incorporated herein by reference.

FIELD

Embodiments described herein relate to an ink composition used in an inkjet recording apparatus and more particularly to an aqueous pigment ink composition.

BACKGROUND

An inkjet recording method, which is carried out printing onto a recording medium by ejecting ink droplets onto the recording medium, is capable of printing a high-definition image of high quality at a high speed. In addition to a printer used in an office and the like that prints on plain paper, an industrial printer such as a label printer also employs the ink recording method.

In recent years, a pigment-based color material is increasingly used for such an industrial printer in place of dye-based color material because the ink using a pigment-based color material has better resistance to water and fading than an ink using a dye-based color material.

In addition, images printed on a variety of different recording media that are used, including uncoated paper such as plain paper and recycled paper, coated paper, plastic film having a hydrophobic surface, etc., are required to be of high quality and have excellent water resistance, outstanding adhesion and other characteristics. To meet the requirements for such characteristics, a variety of different ink compositions for inkjet recording have been proposed.

BRIEF DESCRIPTION OF THE DRAWINGS

FIG. 1 is a diagram illustrating an example of an inkjet recording apparatus according to one embodiment.

DETAILED DESCRIPTION

In accordance with one embodiment, an ink composition for inkjet recording comprises a pigment, a pigment dispersant, water, a water-soluble solvent, a wettability enhancer including 2,5,8,11-tetramethyl-6-dodecyne-5,8-diol, and an aqueous resin emulsion. Preferably, the aqueous resin emulsion is an acrylic resin emulsion.

The ink composition (hereinafter also referred to as 'ink') for inkjet recording according to the present embodiment is described below in detail.

'Ink'

(Pigment)

The pigment used in the ink according to the present embodiment, to which no specific limitation is given, may be either an inorganic pigment or an organic pigment. The inorganic pigment may be, for example, titanium oxide, an aluminum pigment and ferric oxide. Further, carbon black prepared by using a contact method, a furnace method, a thermal method and the like may be used.

The organic pigment may be, for example, an azo pigment (including an azo lake pigment, an insoluble azo pigment, a condensed azo pigment, a chelate azo pigment, etc.), a polycyclic pigment such as a phthalocyanine pigment, a perylene pigment, a perynone pigment, an anthraquinone pigment, a quinacridone pigment, a dioxazine pigment, a thioindigo pigment, an isoindolinone pigment, a quinophthalone pigment and the like, a dye chelate such as a basic dye type chelate and an acid dye type chelate, a nitro pigment, a nitroso pigment, an aniline black and the like.

Specifically, the carbon black used in a black ink may be, for example, No. 2300, No. 900, MCF88, No. 33, No. 40, No. 45, No. 52, MA7, MA8, MA100, No. 2200B, etc. (produced by Mitsubishi Chemical Corporation), Raven 5750, Raven 5250, Raven 5000, Raven 3500, Raven 1255, Raven 700, etc. (produced by Colombia Corporation), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (produced by Cabot Corporation), and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4, etc. (produced by Degussa Corporation).

Specifically, the pigment used in a yellow ink may be, for example, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180 and C.I. Pigment Yellow 185.

Specifically, the pigment used in a magenta ink may be, for example, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202 and C.I. Pigment Violet 19, etc.

Specifically, the pigment used in a cyan ink may be, for example, C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4 and C.I. Vat Blue 60.

In the ink composition for inkjet recording, the average particle size of the pigment is generally within the range of 10 nm to 300 nm and more generally within the range of 10 nm to 200 nm. The average particle size of the pigment may be measured with a particle size analyzer using a dynamic light scattering method. The particle size analyzer may be, for example, HPPS (produced by Malvern Ltd.)

The pigment can be used in the form of a pigment dispersion which may be prepared by dispersing the pigment in water through a dispersant that will be described later.

Further, a self-dispersion pigment which can be dispersed in water by itself without using a dispersant may be used in the present embodiment. In this case, the dispersant that will be described later will be used to perform a re-dispersing processing for the following reason.

As the development of a self-dispersion pigment generally focuses on the dispersion stability of the self-dispersion pigment in water, the addition of a strongly hydrophobic material, a resin emulsion or the like in the ink, will lead to an increase in the particle diameter of the pigment or the agglutination and sedimentation of the pigment as time elapses.

As to this problem, the inventors have discovered that if the ink composition having a superior storage stability can be obtained, that is, if an ink composition can be prepared by transforming a dispersion resulting from re-dispersing a self-dispersion pigment with the dispersant, into ink, then there will be no increase in the particle diameter of the pigment in the ink composition or the agglutination and sedimentation of the pigment as time elapses even if a strongly hydrophobic material or resin emulsion is added in the ink composition.

Preferably, the pigment accounts for 2-15% by weight of the ink. If the content of the pigment is within this range, then the printings can have a desired image density while the storage stability and the output performance of the ink are not undermined. More preferably, the pigment accounts for 3-10% by weight of the ink.

(Dispersant)

The dispersant applicable to the ink according to the present embodiment may be, for example, a polymeric dispersant and a surfactant.

The polymeric dispersant may be, for example, polyvinyl alcohol, polyvinyl pyrrolidone, polyacrylic acid, acrylic acid-acrylonitrile copolymer, acrylic acid-acrylic acid ester copolymer, styrene-acrylic acid copolymer, styrene-methacrylic acid copolymer and styrene-maleic acid copolymer.

The surfactant may be, for example, an anionic surfactant such as fatty acid salts, higher alkyl dicarboxylate, higher alcohol sulfate ester salts, higher alkyl sulfonate, a condensate of higher fatty acid and amino acid, sulfosuccinic acid ester salt, naphthenic acid salt, liquid fatty oil sulfuric acid ester salts, alkylaryl sulfonic acid salt, polyoxyethylene alkyl ether carboxylate, polyoxyethylene alkyl ether sulfuric acid ester salt, polyoxyethylene alkyl ether phosphate and the like and a nonionic surfactant such as polyoxyethylene alkyl ethers, polyoxyethylene alkyl esters, sorbitan alkyl esters, polyoxyethylene sorbitan alkyl esters, acetylene glycols and the like.

Preferably, the surfactant is a polyoxyethylene anionic surfactant such as polyoxyethylene alkyl ether carboxylate, polyoxyethylene alkyl ether sulfuric acid ester salt, polyoxyethylene alkyl ether phosphate and the like. The use of the polyoxyethylene anionic surfactant as a dispersant can inhibit the increase in particle diameter and the sedimentation of particles over time and enable the ink to possess outstanding storage stability.

The amount of the added dispersant is preferably 1-50%, and more preferably 5-40%, by weight of the pigment.

(Fixing Agent)

A resin emulsion is added in the ink according to the present embodiment as a fixing agent. The addition of the resin emulsion improves the fixation property and the abrasion resistance of the printings. The resin emulsion referred to herein is an aqueous resin emulsion, the continuous phase of which is water and the dispersed phase of which is a resin component.

Preferably, the dispersed phase of the resin emulsion is acrylic acid resin, methacrylic acid resin, styrene resin, urethane resin, maleic acid resin, acrylamide resin, epoxy resin or the mixture system thereof. The resin may be a block copolymer, a random copolymer, a graft copolymer and a core-shell type polymer, but not limited to be formed through copolymerization.

It is preferred that the resin component of the resin emulsion is an acrylic resin emulsion the dispersed phase of which contains an acrylic acid component and a methacrylic acid component. Also, it is preferred that the acrylic resin emulsion has a core-shell structure in which the core part is hydrophobic acrylic resin and the shell part is aqueous urethane resin or acrylic graft aqueous urethane resin.

The amount of the added resin emulsion, which can be determined properly, is preferably 1-30%, and more preferably, 3-20%, of the total weight of the ink.

(Wettability Enhancer)

In the ink according to the present embodiment, the wettability enhancer may be 2,5,8,11-tetramethyl-6-dodecyne-5,8-diol. The ink added with 2,5,8,11-tetramethyl-6-dodecyne-5,8-diol provides an excellent large-scale wettability to the recording media including uncoated paper such as plain paper and recycled paper, and coated paper and media, the hydrophobic surface layer of which contains polypropylene, vinyl chloride and the like, with one ink.

With the use of the ink of the present embodiment added with 2,5,8,11-tetramethyl-6-dodecyne-5,8-diol in conjunction with the resin emulsion, a high-density high-quality image with little strike-through of ink can be obtained from the printing on uncoated paper such as plain paper and recycled paper, and a high-density high-quality image presenting excellent wettability can be obtained from the printing on coated paper or media the surface layer of which contains polypropylene, vinyl chloride and the like.

It should be understood that the excellent wettability to such a wide range of media relies on the strongly hydrophobic 2,5,8,11-tetramethyl-6-dodecyne-5,8-diol, which, by means of its hydrophobicity, can wet sizing agent of plain paper, the coating agent of coated paper and other hydrophobic media well.

The amount of the added 2,5,8,11-tetramethyl-6-dodecyne-5,8-diol is preferably 0.1-0.5%, more preferably 0.3-3%, of the total weight of the ink.

(Water-soluble Organic Solvent)

The water-soluble organic solvent can serve as a wetting agent for preventing the ink from becoming dry. Further, the water-soluble organic solvent also has an effect of enhancing the dispersion stability of the pigment in the ink. The water-soluble organic solvent may be, for example, polyhydric alcohol, a nitrogen-containing heterocyclic compound, amines or a sulphur-containing compound.

The polyhydric alcohol may be, for example, ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol and 3-methyl-1,3,5-pentanetriol and the like.

The sulphur-containing compound may be, for example, N-methyl-2-pyrrolidone, N-hydroxyethyl-2-pyrrolidone, 2-pyrrolidone, 1,3-dimethyl imidazolidinone and ϵ-caprolactam.

The amines may be, for example, monoethanolamine, diethanolamine, triethanolamine, monoethylamine, diethylamine and triethylamine.

The sulphur-containing compound may be, for example, dimethyl sulfoxide, sulfolane and thiodiethanol.

Further, propylene carbonate, ethylene carbonate, γ-butyrolactone and the like may serve as the wetting agent.

These water-soluble organic solvents may be used independently or in combination.

Among the water-soluble organic solvents, glycerin is less volatile and has an excellent water-retaining property and a high boiling point when compared with the others. For this sake, it is preferred that at least part of the water-soluble organic solvent is glycerin. Specifically, the compounding ratio of glycerin in the water-soluble organic solvent is preferably above 50% by weight.

The amount of the added water-soluble organic solvent is preferably 1-40%, and more preferably 2-15%, of the total weight of the ink.

Further, to provide a wetting effect, a solid wetting agent like urea, thiourea and ethylene urea can be used simultaneously. In this case, it is preferred that the compound solid wetting agent accounts for less than 30% by weight of the water-soluble organic solvent.

(Surface Tension Adjusting Agent)

A surface tension adjusting agent may be added in the ink according to the present embodiment. The foregoing non-ionic surfactant used in the dispersant may serve as the surface tension adjusting agent.

The surface tension adjusting agent may be, for example, polyoxyethylene alkyl ethers, polyoxyethylene alkyl esters, sorbitan alkyl esters, polyoxyethylene sorbitan alkyl esters and acetylene glycols. Further, the surface tension adjusting agent may also be silicone-based surfactants or fluorine-based surfactants and the like.

The amount of the added surface tension adjusting agent may be 0.5-3% of the total weight of the ink.

(Penetrant)

3-methoxy-3-methyl-1-butanol, which is capable of promoting the ink absorption onto paper and quickening the drying of the ink thereon, may be contained in the ink according to the present embodiment as a penetrant.

The addition of 3-methoxy-3-methyl-1-butanol in an amount equal to 0.5-20% of the total weight of the ink will achieve the foregoing effect without causing any inconvenience.

(Other Additives)

Further, additives like pH regulator and preservative fungicide may also be compounded in the ink according to the present embodiment as needed. The pH regulator may be, for example, sodium hydroxide, potassium hydroxide, potassium dihydrogenphosphate and disodium hydrogenphosphate. The preservative fungicide may be, for example, sodium benzoate, sodium pentachlorophenol, 2-pyridinethiol-1-oxide sodium, sodium sorbate, sodium dehydroacetate and 1,2-dibenzisothiazolin-3-one and the like.

The ink according to the present embodiment is required to have a viscosity suitable for the ejection of the ink from the nozzle of an inkjet printer, specifically, the viscosity is preferably below 20 mPa·s at 25 degrees centigrade.

(Recording Method)

The ink according to the present embodiment is a material which is ejected onto a recording surface as droplets and adhered to the recording surface for printing. It is found that the print resulting from the use of the ink according to the present embodiment on a recording medium having poor ink absorbability (e.g. PVC, PET, polypropylene) can be fixed thereon after being heated. Further, the print resulting from the use of the ink according to the present embodiment on plain paper and coated paper having high ink absorbability can be fixed thereon without being heated.

The ink according to the present embodiment is recorded on media such as paper by, for example, an inkjet recording apparatus which will be described below.

(Inkjet Recording Apparatus)

FIG. 1 is a diagram illustrating an example of an inkjet recording apparatus according to the present embodiment.

As shown in FIG. 1, an inkjet recording apparatus 100 comprises a paper feeding section 101, a recording section 102 and a paper discharge section 103.

The paper feeding section 101 comprises paper cassettes 104 and 105 for holding paper P of different sizes and paper feed rollers 106 and 107 for taking paper P out from the paper cassettes 104 and 105. Conveyance roller pairs 108 and 109 are arranged at the downstream side in the paper conveyance direction of the paper feed rollers 106 and 107, and the paper feed roller 106 or 107 takes paper P of a selected paper size from the paper cassette 104 or 105 and conveys the paper P to the conveyance roller pair 108 or 109. Further, a register roller pair 110 is arranged at the downstream side in the paper conveyance direction of the conveyance roller pair 108 or 109 to convey the paper P conveyed by the conveyance roller pair 108 or 109 to a conveyance belt 111.

The recording section 102 comprises the conveyance belt 111 and an inkjet head section 112. Tension is applied to the conveyance belt 111 by a drive roller 113 and two driven rollers 114. Holes are arranged on the surface of the conveyance belt 111 at given intervals, a negative pressure chamber 116 connected with a fan 115 is arranged to absorb the paper P on the conveyance belt 111 from the inner side of the conveyance belt 111.

An inkjet head section 112 is arranged above the conveyance belt 111. Inkjet heads of the inkjet head section 112 for ejecting ink onto paper according to image data are sequentially arranged: an inkjet head 117C for jetting Cyan (C) ink from an upstream side, an inkjet head 117M for jetting Magenta (M) ink, an inkjet head 117Y for jetting Yellow (Y) ink and an inkjet head 117Bk for jetting Black (Bk) ink.

A Cyan (C) ink cartridge 118C, a Magenta (M) ink cartridge 118M, a Yellow (Y) ink cartridge 118Y and a Black (Bk) ink cartridge 118C for accommodating corresponding ink are arranged to supply ink to the inkjet heads 117C, 117M, 117Y and 117Bk. The ink cartridges 118C, 118M, 118Y and 118Bk are connected with the inkjet heads 117C, 117M, 117Y and 117Bk through tubes 119C, 119M, 119Y and 119Bk, respectively. The ink according to the present embodiment is accommodated in each of the ink cartridges.

The paper discharge section 103 comprises a paper discharge tray 120 and a paper discharge roller pair 121. The paper P passing the conveyance belt 111 is conveyed to the paper discharge roller pair 121 via conveyance roller pairs 122 and 123. The paper discharge roller pair 121 discharges the paper P passing the conveyance roller pair 123 to the paper discharge tray 120.

Then, the image forming operation of the inkjet recording apparatus 100 is described.

First, an image processing for recording is started by an image processing apparatus (not shown) to send image data for recording to the inkjet heads 117C, 117M, 117Y and 117Bk. Further, paper P of a selected paper size is taken from the cassette 104 or 105 by the paper feed roller 106 or 107 one sheet at a time and conveyed to the conveyance roller pairs 108 and 109 and the register roller pair 110. The register roller pair 110 corrects the skew of the paper P and conveys the paper P at a specific timing.

The negative pressure chamber 116 sucks air through the holes on the conveyance belt 111, and the paper P passes from below the inkjet heads 117C, 117M, 117Y and 117Bk while being absorbed on the conveyance belt 111. Thus, a certain gap is kept between the inkjet heads 117C, 117M, 117Y and 117Bk and the paper P. Different colors of ink are ejected from the inkjet heads 117C, 117M, 117Y and 117Bk in synchronization with the conveyance of the paper P from the register roller pair 110. In this way, color images are formed at desired positions of the paper P. The paper P on which images are formed is discharged to the paper discharge tray 120 by the conveyance roller pairs 122 and 123 and the paper discharge roller pair 121.

'Embodiments'

The present invention is described below in detail with reference to embodiments and comparative examples; however, the present invention is not limited to the following embodiments. Further, the following symbols '%' represent percentage by weight unless otherwise specified.

'Preparation of Pigment Dispersion'

The following four kinds of pigment dispersion are prepared.

(Black Dispersion)

Carbon black 25%

Polyoxyethylene anionic surfactant 5%

Pure water 70%

Carbon black, polyoxyethylene anionic surfactant and pure water are mixed according to the foregoing formulation, and the mixture is dispersed in a bead mill using zirconia beads. Then, the beads are removed, and oversize particles are centrifugally separated and filtered using a micron membrane filter from the dispersed mixture to obtain a black dispersion.

(Cyan Dispersion)

Pigment blue 15:4 25%

Polyoxyethylene anionic surfactant 5%

Pure water 70%

Pigment blue 15:4, polyoxyethylene anionic surfactant and pure water are mixed according to the foregoing formulation, and the mixture is dispersed in a bead mill using zirconia beads. Then, the beads are removed, and oversize particles are centrifugally separated and filtered using a micron membrane filter from the dispersed mixture to obtain a cyan dispersion.

(Magenta Dispersion)

Pigment red 122 25%

Polyoxyethylene anionic surfactant 5%

Pure water 70%

Pigment red 122, polyoxyethylene anionic surfactant and pure water are mixed according to the foregoing formulation, and the mixture is dispersed in a bead mill using zirconia beads. Then, the beads are removed, and oversize particles are centrifugally separated and filtered using a micron membrane filter from the dispersed mixture to obtain a magenta dispersion.

(Yellow Dispersion)

Pigment yellow 74 25%

Polyoxyethylene anionic surfactant 5%

Pure water 70%

Pigment yellow 74, polyoxyethylene anionic surfactant and pure water are mixed according to the foregoing formulation, and the mixture is dispersed in a bead mill using zirconia beads. Then, the beads are removed, and oversize particles are centrifugally separated and filtered using a micron membrane filter from the dispersed mixture to obtain a yellow dispersion.

'Preparation of Ink'

'Embodiments 1-6'

Ink samples are prepared with the components shown in the following Table 1 according to the formulation shown in the following Table 1. In the preparation of the ink samples, first, the components are stirred for 1 hour using a stirrer. Then, the stirred materials are filtered using a micron membrane filter to obtain ink samples of embodiments 1-6.

TABLE 1

| | Embodiment 1 | Embodiment 2 | Embodiment 3 | Embodiment 4 | Embodiment 5 | Embodiment 6 |
|---|---|---|---|---|---|---|
| Black dispersion | 20 | | | | 20 | 20 |
| Cyan dispersion | | 20 | | | | |
| Magenta dispersion | | | 20 | | | |
| Yellow dispersion | | | | 20 | | |
| Propylene glycol | 10 | | 5 | | | |
| Dipropylene glycol | | 10 | | | | |
| Triethylene glycol | 5 | | | | | |
| Polyethylene glycol #200 | | | | 10 | | |
| Polyethylene glycol #400 | | | 10 | | 5 | |
| Glycerin | | | | | 5 | 10 |
| Emulsion A*1 | 20 | | | 10 | | |
| Emulsion B*2 | | 20 | | 10 | | |
| Emulsion C*3 | | | 20 | | | |
| Emulsion D*4 | | | | | 20 | |
| Emulsion E*5 | | | | | | 20 |
| TDD*6 | 1 | 1 | 1 | 1 | 1 | 1 |
| NiKKOL-BT7*7 | 1 | 1 | 1 | 1 | 1 | 1 |
| MMB*8 | | | | | 1 | 1 |
| Proxel xL-2 | 0.2 | 0.2 | 0.2 | 0.2 | 0.2 | 0.2 |
| Pure water | 42.8 | 47.8 | 42.8 | 47.8 | 46.8 | 46.8 |

"Remarks"

*1styrene-acrylic acid copolymer

*2acrylic acid ester copolymer

*3styrene-maleic acid copolymer

*4core-shell type acrylic-urethane emulsion (core part: hydrophobic acrylic; shell part: aqueous urethane)

*5core-shell type acrylic-urethane emulsion (core part: hydrophobic acrylic; shell part: acrylic graft aqueous urethane)

*62,5,8,11-tetramethyl-6-dodecyne-5,8-diol

*7nonionic surfactants (produced by Nikko Chemicals Co., Ltd.)

*83-methoxy-3-methyl-1-butanol

COMPARATIVE EXAMPLES 1-6

Ink samples are prepared with the components shown in the following Table 2 according to the formulation shown in the following Table 2. In the preparation of the ink samples, first, the components are stirred for 1 hour using a stirrer. Then, the stirred materials are filtered using a micron membrane filter to obtain ink samples of comparative examples 1-6.

TABLE 2

| | Comparative example 1 | Comparative example 2 | Comparative example 3 | Comparative example 4 | Comparative example 5 | Comparative example 6 |
|---|---|---|---|---|---|---|
| Black dispersion | 20 | | | | 20 | 20 |
| Cyan dispersion | | 20 | | | | |
| Magenta dispersion | | | 20 | | | |
| Yellow dispersion | | | | 20 | | |
| Propylene glycol | 10 | | 5 | | | |
| Dipropylene glycol | | 10 | | | | |
| Triethylene glycol | 5 | | | | | |
| Polyethylene glycol #200 | | | | 10 | | |
| Polyethylene glycol #400 | | | 10 | | 5 | |
| Glycerin | | | | | 5 | 10 |
| TDD*6 | 1 | 1 | 1 | 1 | 1 | 1 |
| NIKKOL-BT7*7 | 1 | 1 | 1 | 1 | 1 | 1 |
| MMB*8 | | | | | 1 | 1 |
| Proxel xL-2 | 0.2 | 0.2 | 0.2 | 0.2 | 0.2 | 0.2 |
| Pure water | 62.8 | 67.8 | 62.8 | 67.8 | 66.8 | 66.8 |

'Remarks'
*6, *7 and *8 are the same as those shown in Table 1.

'Evaluation Tests'

A print job is carried out on each recording medium using the obtained ink samples to evaluate the image density, the adhesion and the water resistance of the printing. Printing is carried out on a 10 mm*10 mm area on a recording medium using an inkjet recording apparatus carrying a Toshiba Tec piezo head at 100% duty cycle.

In the evaluation, the recording media used include Toshiba copy paper which is used as plain paper (uncoated paper), ART E PW8R (produced by Lintec Corporation) which is used as coated paper and YUPO 80 (UV) PA-T1 (produced by Lintec Corporation) and PVC 80M (produced by Lintec Corporation) which are used as recording media having a hydrophobic surface.

The ink samples printed on YUPO 80 (UV) and PVC 80M are heated by a dryer for 10 seconds to be dried. At this time, the surface temperature of the recording medium is below 50 degrees centigrade.

The heating and drying processing is not carried out on the ink samples printed on Toshiba copy paper and ART E PW8R.

The image density, the adhesion and the water resistance of the obtained images are evaluated using the following method.

(Image Density)

The image density of the solid section (printing section) is measured using a spectral photometer X-Rite.

(Adhesion)

A Scotch mending tape 810 (produced by 3M Company) is pasted on a printing section for printing samples and then rubbed with fingers for three times to be stripped off. The printing state of the section is visually observed and evaluated according to the following standard:

○: no ink (pigment) is stripped off from the recording medium.

Δ: part of ink (pigment) is stripped off from the recording medium.

×: most of ink (pigment) is stripped off from the recording medium.

(Water Resistance)

One drop of tap water is adhered on the printing section of printing samples, the printing section is placed for 1 minute, and then the water drop is wiped off with cotton cloth, then water resistance is evaluated according to the following standard:

○: no ink (pigment) is stripped off from the recording medium, and the cotton is not colorized.

Δ: part of ink (pigment) is stripped off from the recording medium, and the colorization of the cotton can be observed.

×: most of ink (pigment) is stripped off from the recording medium, and the cotton is severely colorized.

TABLE 3

| Embodiment | 1 | 2 | 3 | 4 | 5 | 6 |
|---|---|---|---|---|---|---|
| | Image density | | | | | |
| Toshiba copy paper | 1.43 | 1.36 | 1.32 | 1.28 | 1.45 | 1.48 |
| ART E PW 8R | 1.56 | 1.62 | 1.45 | 1.43 | 1.62 | 1.68 |
| YUPO 80(UV) | 1.45 | 1.53 | 1.39 | 1.33 | 1.48 | 1.51 |
| PVC80M | 1.41 | 1.49 | 1.42 | 1.35 | 1.44 | 1.47 |
| | Adhesion | | | | | |
| Toshiba copy paper | ○ | ○ | ○ | ○ | ○ | ○ |
| ART E PW 8R | ○ | ○ | ○ | ○ | ○ | ○ |
| YUPO 80(UV) | ○ | ○ | ○ | ○ | ○ | ○ |
| PVC80M | ○ | ○ | ○ | ○ | ○ | ○ |
| | Water resistance | | | | | |
| Toshiba copy paper | ○ | ○ | ○ | ○ | ○ | ○ |
| ART E PW 8R | ○ | ○ | ○ | ○ | ○ | ○ |

TABLE 3-continued

| Embodiment | 1 | 2 | 3 | 4 | 5 | 6 |
|---|---|---|---|---|---|---|
| YUPO 80(UV) | ○ | ○ | ○ | ○ | ○ | ○ |
| PVC80M | ○ | ○ | ○ | ○ | ○ | ○ |

TABLE 4

| | Comparative example | | | | | |
|---|---|---|---|---|---|---|
| | 1 | 2 | 3 | 4 | 5 | 6 |
| | Image density | | | | | |
| Toshiba copy paper | 1.24 | 1.15 | 1.06 | 0.93 | 1.17 | 1.22 |
| ART E PW 8R | 1.31 | 1.27 | 1.19 | 1.13 | 1.34 | 1.3 |
| YUPO 80(UV) | Unprintable (cissing, drying failure) | | | | | |
| PVC80M | Unprintable (cissing, drying failure) | | | | | |
| | Adhesion | | | | | |
| Toshiba copy paper | ○ | ○ | ○ | ○ | ○ | ○ |
| ART E PW 8R | X | X | X | X | X | X |
| YUPO 80(UV) | Unprintable (cissing, drying failure) | | | | | |
| PVC80M | Unprintable (cissing, drying failure) | | | | | |
| | Water resistance | | | | | |
| Toshiba copy paper | Δ | Δ | Δ | Δ | Δ | Δ |
| ART E PW 8R | X | X | X | X | X | X |
| YUPO 80(UV) | Unprintable (cissing, drying failure) | | | | | |
| PVC80M | Unprintable (cissing, drying failure) | | | | | |

According to the evaluation results presented in Table 3 and Table 4, in the embodiments 1-6 in which the ink according to the present embodiment are used, the evaluation results on the image density, the adhesion and the water resistance of the images on plain paper (uncoated paper), coated paper and recording media having a hydrophobic surface are desirable.

On the other hand, it can be observed from comparative examples 1-6 that it is impossible to print on a recording medium having a hydrophobic surface. Further, it can be observed that although a print job can be carried out on plain paper and coated paper, the image density of the print is inferior to that obtained in embodiments and that although the print has a favorable adhesion on plain paper, much ink is stripped off from coated paper. Also, in comparison to the embodiments, the water resistance of the print on plain paper is poor and the water resistance of the print on coated paper is even worse.

Thus, a high-density high-quality image and a print excellent in water resistance and adhesion can be obtained using the ink according to the present embodiment on a wide variety of recording media, including uncoated paper such as plain paper and recycled paper, coated paper and other media having a hydrophobic surface.

What is claimed is:

1. An ink composition for inkjet recording, comprising:
a pigment;
a pigment dispersant;
water;
a water-soluble solvent;
a wettability enhancer including 2,5,8,11-tetramethyl-6-dodecyne-5,8-diol; and
an aqueous resin emulsion having a core-shell structure in which a core part is a hydrophobic acrylic resin and a shell part is an aqueous urethane resin or acrylic graft aqueous urethane resin.

2. The ink composition for inkjet recording according to claim 1, wherein the aqueous resin emulsion is an acrylic resin emulsion.

3. The ink composition for inkjet recording according to claim 1, wherein the pigment dispersant is a polyoxyethylene anionic surfactant.

4. The ink composition for inkjet recording according to claim 3, wherein
the polyoxyethylene anionic surfactant is at least one material selected from polyoxyethylene alkyl ether carboxylate, polyoxyethylene alkyl ether sulfuric acid ester salt and polyoxyethylene alkyl ether phosphate.

5. The ink composition for inkjet recording according to claim 1, further comprising:
a penetrant including 3-methoxy-3-methyl-1-butanol.

6. The ink composition for inkjet recording according to claim 1, wherein
the water-soluble organic solvent contains more than 50% by weight of glycerin.

7. An ink cartridge containing an ink composition for inkjet recording,
the ink composition comprising:
a pigment;
a pigment dispersant;
water;
a water-soluble solvent;
a wettability enhancer including 2,5,8,11-tetramethyl-6-dodecyne-5,8-diol; and
an aqueous resin emulsion having a core-shell structure in which a core part is a hydrophobic acrylic resin and a shell part is an aqueous urethane resin or acrylic graft aqueous urethane resin.

8. The ink cartridge according to claim 7, wherein
the aqueous resin emulsion is an acrylic resin emulsion.

9. The ink cartridge according to claim 7, wherein
the pigment dispersant is a polyoxyethylene anionic surfactant.

10. The ink cartridge according to claim 9, wherein
the polyoxyethylene anionic surfactant is at least one material selected from polyoxyethylene alkyl ether carboxylate, polyoxyethylene alkyl ether sulfuric acid ester salt and polyoxyethylene alkyl ether phosphate.

11. The ink cartridge according to claim 8, wherein the ink composition further comprises:
a penetrant including 3-methoxy-3-methyl-1-butanol.

12. The ink cartridge according to claim 8, wherein
the water-soluble organic solvent contains more than 50% by weight of glycerin.

13. An inkjet recording apparatus, comprising:
a recording section including an inkjet head containing an ink and from which the ink is ejected onto a recording medium that is conveyed from a recording medium feeding section to a recording medium discharge section, wherein the ink has an ink composition that includes
a pigment;
a pigment dispersant;
water;
a water-soluble solvent;
a wettability enhancer including 2,5,8,11-tetramethyl-6-dodecyne-5,8-diol; and
an aqueous resin emulsion having a core-shell structure in which a core part is a hydrophobic acrylic resin and a shell part is an aqueous urethane resin or acrylic graft aqueous urethane resin.

14. The apparatus according to claim 13, wherein
the aqueous resin emulsion is an acrylic resin emulsion.

15. The apparatus according to claim 13, wherein the pigment dispersant is a polyoxyethylene anionic surfactant that is at least one material selected from polyoxyethylene alkyl ether carboxylate, polyoxyethylene alkyl ether sulfuric acid ester salt and polyoxyethylene alkyl ether phosphate.

16. The apparatus according to claim 13, wherein the ink composition further includes:

a penetrant including 3-methoxy-3-methyl-1-butanol.

17. The apparatus according to claim 13, wherein the water-soluble organic solvent contains more than 50% by weight of glycerin.

* * * * *